US008384939B2

(12) United States Patent
Patterson

(10) Patent No.: US 8,384,939 B2
(45) Date of Patent: Feb. 26, 2013

(54) DOCUMENT IMAGING SYSTEM AND METHOD

(76) Inventor: William Patterson, Scottsdale, AZ (US)

( * ) Notice: Subject to any disclaimer, the term of this patent is extended or adjusted under 35 U.S.C. 154(b) by 400 days.

(21) Appl. No.: 12/710,088

(22) Filed: Feb. 22, 2010

(65) Prior Publication Data

US 2010/0214629 A1 Aug. 26, 2010

Related U.S. Application Data

(60) Provisional application No. 61/154,983, filed on Feb. 24, 2009.

(51) Int. Cl.
*G06F 3/12* (2006.01)
(52) U.S. Cl. ....... 358/1.15; 358/402; 358/473; 358/474; 379/100.17; 709/228
(58) Field of Classification Search .................. 358/474, 358/497, 496, 473, 1.15, 442, 402; 379/100.17, 379/93.32; 709/228, 218
See application file for complete search history.

(56) References Cited

U.S. PATENT DOCUMENTS

| 7,142,333 | B2 | 11/2006 | Struble | |
| 7,167,604 | B2 | 1/2007 | Allen et al. | |
| 7,305,457 | B2* | 12/2007 | Yajima et al. | 709/220 |
| 7,364,077 | B2* | 4/2008 | Wolf, II | 235/454 |
| 7,593,605 | B2* | 9/2009 | King et al. | 382/313 |
| 7,599,844 | B2* | 10/2009 | King et al. | 705/1.1 |
| 7,650,522 | B2* | 1/2010 | Linsley-Hood et al. | 713/321 |
| 7,953,441 | B2* | 5/2011 | Lors | 455/557 |
| 2004/0227979 | A1 | 11/2004 | Chen | |
| 2008/0313172 | A1* | 12/2008 | King et al. | 707/5 |
| 2010/0091341 | A1* | 4/2010 | Ruskin et al. | 358/474 |

* cited by examiner

Primary Examiner — Negussie Worku
(74) Attorney, Agent, or Firm — Snell & Wilmer L.L.P.

(57) ABSTRACT

A document imaging system is configured to allow scanning and transmission of document images. A scanner system images a document and wirelessly transmits the image to a personal digital assistant (PDA). The PDA transmits the image to a document server located on a network. An authenticated user may then retrieve a scanned document image from the document server via the network. Because the scanner system and/or PDA may be located in a remote location, remote documents may be quickly presented for viewing by a user.

19 Claims, 3 Drawing Sheets

DOCUMENT IMAGING SYSTEM AND METHOD

CROSS REFERENCE TO RELATED APPLICATIONS

This application is a nonprovisional of U.S. Provisional No. 61/154,983 filed Feb. 24, 2009 and entitled "DOCUMENT IMAGING SYSTEM." The entire contents of the foregoing application are hereby incorporated by reference.

TECHNICAL FIELD

The present disclosure relates to document imaging, particularly portable imaging of documents via use of a personal digital assistant or other mobile communication device.

BACKGROUND

Various approaches to document scanning and imaging are known in the art. In particular, manufacturers have sought to provide systems capable of scanning documents in a first location, and allowing a user in a second location to view the resulting scanned images. For example, to accomplish this goal, various document imaging systems require direct communication between a web server and a networked scanner. Such systems are bulky and expensive.

Portable approaches to document scanning have also been attempted. Some approaches require complex mapping and tracking systems to monitor where the scanning element is located on a page. Other approaches feature cumbersome optical guidance features to assist the user in moving the scanning element over the desired area to be scanned. Yet other approaches suffer from limited communications range, for example due to the wireless protocol they implement.

Therefore, it remains desirable to provide a document imaging system capable of remote acquisition of documents.

SUMMARY

In an exemplary embodiment, a document imaging system comprises a scanner system, a mobile communication device coupled to the scanner system via a first wireless connection, and a document server coupled to the mobile communication device via a second wireless connection. The scanner system acquires a scanned image and transmits the scanned image to the mobile communication device via the first wireless connection. The mobile communication device transmits the scanned image to the document server via the second wireless connection. The document server delivers the scanned image from the document server to an authorized user responsive to a request for the scanned image from the authorized user.

In another exemplary embodiment, a method for imaging a document comprises scanning, via a scanner system, the document to produce a scanned image; transmitting, via a first wireless connection, the scanned image from a scanner system to a mobile communication device; transmitting, via a second wireless connection, the scanned image from the mobile communication device to a document server; and delivering the scanned image from the document server to an authorized user responsive to a request for the scanned image from the authorized user.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for document imaging, communications, networking, image processing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical document imaging system.

A document imaging system may be any system configured to facilitate acquisition, storage, and/or retrieval of scanned images. In accordance with an exemplary embodiment, and with reference to FIG. 1, a document imaging system 100 generally comprises an acquisition component 110, a communication component 120, and a storage and retrieval component 130. Acquisition component 110 can comprise a scanner system, or other electronic and/or optical components, systems, and/or devices configured to acquire an electronic image of a document or other item desired to be scanned. is configured to acquire an image, for example via electronic scanning of a document.

Communication component 120 is coupled to acquisition component 110. Communication component 120 may comprise, for example, a portable digital assistant, a smart phone, or other portable electronic communication device, or any other suitable components, systems, and/or devices configured to obtain image data or other data from acquisition component 110 and deliver the data to storage and retrieval component 130.

Storage and retrieval component 130 is coupled to communication component 120. Storage and retrieval component 130 may comprise, for example, a computing system, such as a web server coupled to a network, or any other suitable components, systems, and/or devices configured to store, retrieve, and/or otherwise control access to and/or manage data from acquisition component 110.

Figure 1:
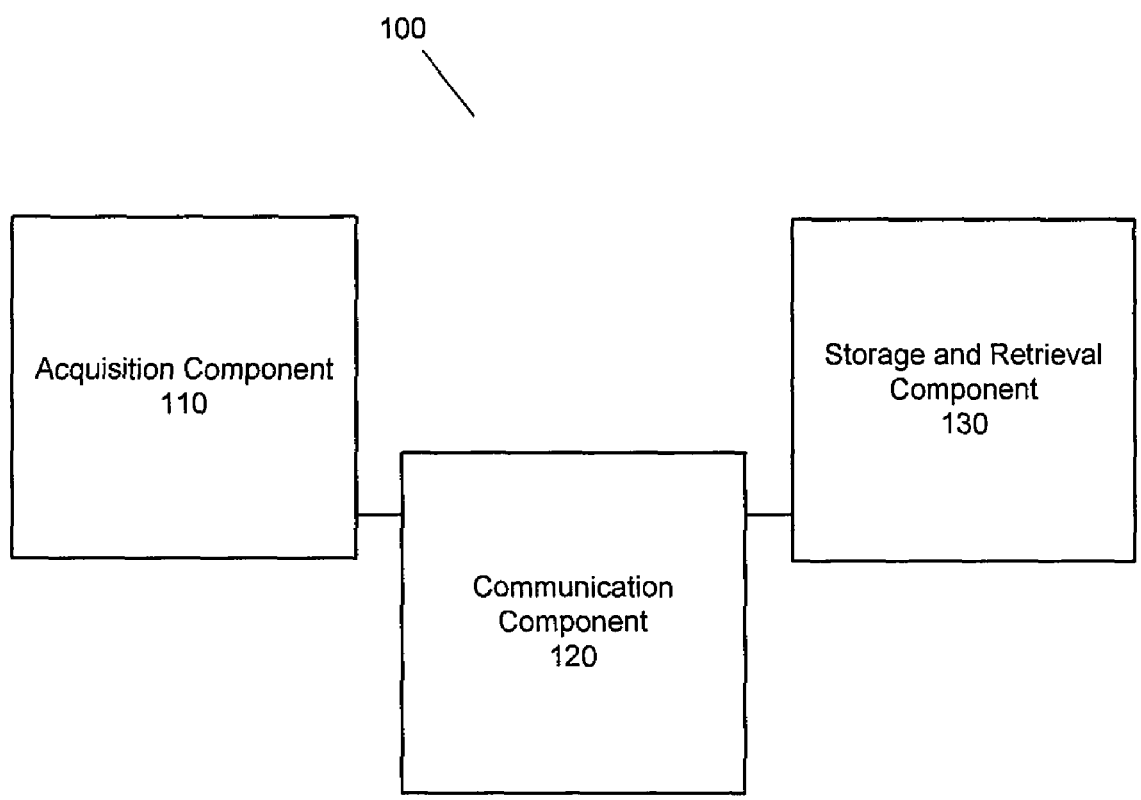
FIG. 1 illustrates a block diagram of a document imaging system in accordance with an exemplary embodiment.

Through use of a document imaging system, for example document imaging system 100 in FIG. 1, various shortcomings of prior imaging approaches and systems may be overcome. Documents may be remotely scanned without the necessity of bulky and/or expensive computers and/or networking and scanning equipment. Drivers, agents, sales representatives, and other field-based personnel may quickly and efficiently obtain document information and return the information to a networked repository for access by one or more additional individuals. Additionally, one or more components of document imaging system 100 may be configured to be usable in connection with a personal computer or other conventional computing device, enabling document imaging system 100 to provide desktop scanning capabilities as well as remote scanning capabilities.

Figure 2:
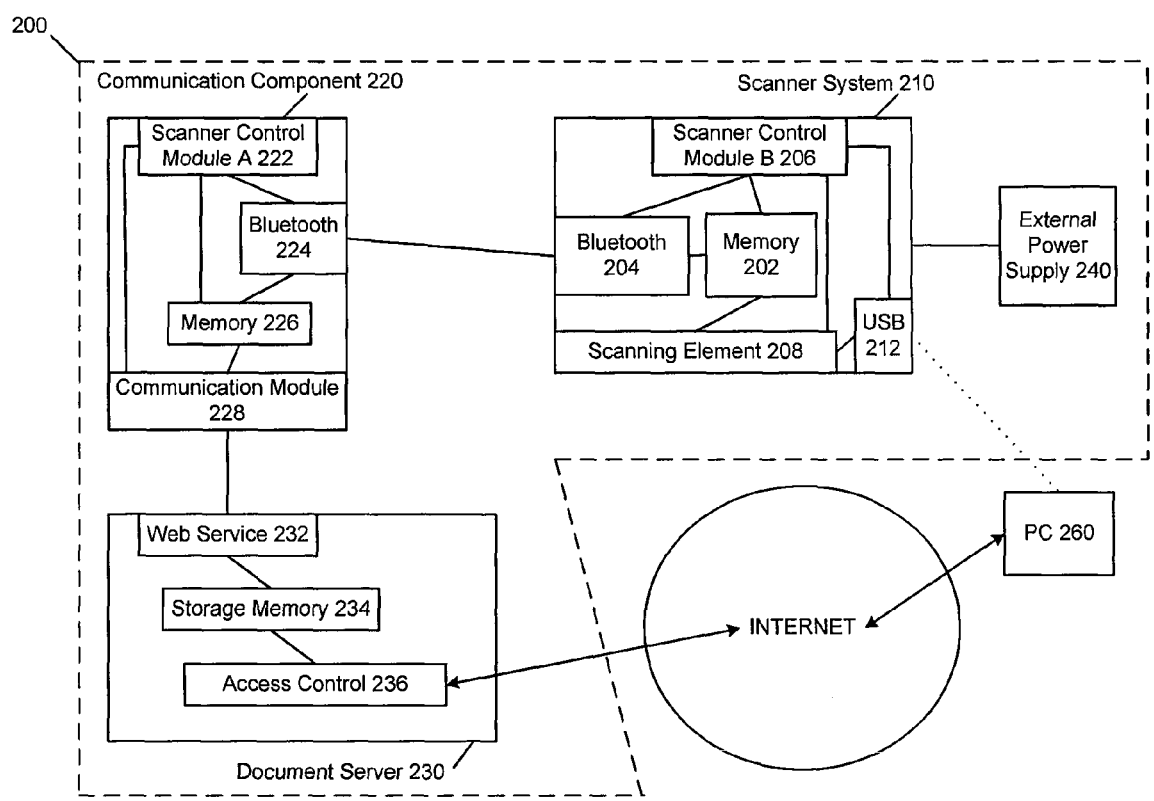
FIG. 2 illustrates a block diagram of a document imaging system in accordance with an exemplary embodiment.

With reference now to FIG. 2, and in accordance with an exemplary embodiment, a document imaging system 100 (for example, document imaging system 200) comprises an acquisition component 110 (for example, scanner system 210), a communication component 120 (for example, communication component 220), and a storage and retrieval component 130 (for example, document server 230). Scanner system 210 comprises scanner Bluetooth module 204, scanner control module B (SCMB) 206, scanning element 208, and scanner memory 202. Scanner system 210 may also comprise USB module 212. Communication component 220 comprises scanner control module A (SCMA) 222, PDA Bluetooth module 224, PDA memory 226, and communication module 228. Document server 230 comprises web service 232, storage memory 234, and access control module 236.

In accordance with an exemplary embodiment, scanner system 210 comprises electronic and optical components configured to acquire an electronic image of a document or other item desired to be scanned. For example, scanner system 210 may comprise a single sheet tractor feed scanner having a charge-coupled device image sensor. In accordance with an exemplary embodiment, scanner system 210 comprises scanner Bluetooth module 204, scanner control module B (SCMB) 206, scanning element 208, and scanner memory 202. Scanner system 210 may operate on internal power, or may optionally be powered by external power supply 240. Moreover, scanner system 210 may comprise any suitable electronic, mechanical, and/or optical elements configured to acquire an electronic image.

Scanner system 210 may also comprise hardware and/or software configured to print an image. For example, communication component 220 may deliver an image to scanner system 210. The received image may then be printed by scanner system 210.

In various exemplary embodiments, scanner system 210 is configured to be portable and compact, allowing scanner system 210 to be hand-carried to a location where document scanning is desired to occur. In an exemplary embodiment, scanner system 210 is configured with dimensions of about 12 inches in width, about 8 inches in depth, and about 2 inches in height. In this exemplary embodiment, scanner system 210 is configured with a weight of about 1.5 pounds. In other exemplary embodiments, scanner system 210 is configured with dimensions of about 6 inches to about 18 inches in width, about 4 inches to about 12 inches in depth, about 0.5 inches to about 4 inches in height, and about 0.5 pounds to about 2.5 pounds in weight. Moreover, scanner system 210 may be configured with any suitable dimensions and/or weights in order to allow scanner system 210 to be utilized for portable document scanning.

Continuing to reference FIG. 2, and in accordance with an exemplary embodiment, SCMB 206 comprises a printed circuit board (PCB), a central processing unit (CPU), and memory sufficient to contain the required proprietary scanning applications and communication protocols. The CPU may comprise any suitable electronic device or combination of devices configured to process instructions, such as fetch, decode, operate, and write-back instructions. In various exemplary embodiments, SCMB 206 may comprise one or more field-programmable gate arrays (FPGAs), electrically erasable programmable read only memories (EEPROMS), microprocessors, microcontrollers, diodes, capacitors, resistors, and the like. Moreover, SCMB 206 may comprise any suitable hardware and/or software elements configured to allow operation of scanner system 210.

Scanner Bluetooth module 204 comprises electrical circuitry configured to provide wireless communication between scanner system 210 and communication component 220, for example via a Bluetooth wireless communication protocol (e.g., a protocol compatible with one or more of IEEE standards 802.15.1-2002 or 802.15.1-2005, or other comparable standard adopted by the Bluetooth Special Interest Group). Scanner Bluetooth module 204 may share certain electrical components with SCMB 206, and may also be fully integrated within SCMB 206. Moreover, communication component 220 and scanner system 210 may communicate via any suitable means, such as via electrical wire, infrared, optical, radio frequency, and the like, or any combination of the above.

Scanning element 208 comprises an optical scanner configured to acquire images from a surface. Scanning element 208 is coupled to SCMB 206 and to scanner memory 202. Moreover, scanning element 208 may comprise any suitable hardware and/or software configured to acquire images from a surface, such as a document, a photograph, a label, and the like, or any combination of the above.

Scanner memory 202 comprises electrical circuitry configured to store data received from scanning element 208. In accordance with an exemplary embodiment, scanner memory 202 comprises flash memory. Scanner memory 202 may also comprise static random access memory (SRAM), magnetoresistive random access memory (MRAM), magnetic core memory, or any other memory technology suitable for storing data.

In certain exemplary embodiments, scanner system 210 further comprises USB module 212. USB module 212 comprises electrical circuitry configured to allow scanner system 210 to connect to other electrical components (for example, a personal computer, smartphone, laptop, netbook, and/or the like) via a wired connection compatible with a Universal Serial Bus (USB) specification. In an exemplary embodiment, USB module 212 comprises USB interface circuitry and a micro-USB connector. USB module 212 is coupled to SCMB 206 and scanning element 208 in order to permit scanner system 210 to communicate with a personal computer 260 or other electrical components.

In an exemplary embodiment, via USB module 212, instructions and/or scanned information may be sent to and/or from scanner system 210 and personal computer 260, for example in connection with scanning software operative on personal computer 260. Scanned information from scanner system 210 may be stored on personal computer 260 in any suitable format and/or directory, under the direction of the operating system of personal computer 260 and/or scanning software operative in connection therewith. Additionally, once scanned information is stored on personal computer 260, it may later be delivered to document server 230 as discussed below.

Moreover, in certain exemplary embodiments, scanner Bluetooth module 204 may be disabled when USB module 212 is active (i.e., when a USB cable is connected to USB module 212 and a USB port on personal computer 260). In this manner, scanner system 210 may utilize a wired connection to personal computer 260 when one is available, allowing scanned information to be transferred to personal computer 260 (and/or from personal computer 260 to document server 230) without requiring use of communication component 220.

In an exemplary embodiment, communication component 220 comprises a portable digital assistant, a smart phone or other portable electronic communication device. In accordance with an exemplary embodiment, communication component 220 comprises scanner control module A (SCMA) 222, PDA Bluetooth module 224, PDA memory 226, and communication module 228. Communication component 220 is coupled to scanner system 210 via PDA Bluetooth module 224. Communication component 220 is also coupled to document server 230 via communication module 228. Communication component 220 may comprise a touch screen or other tactile input element. In accordance with an exemplary embodiment, communication component 220 comprises an electronic device utilizing a Windows Mobile operating system. In various other exemplary embodiments, communication component 220 comprises an electronic device utilizing a PalmOS operating system, a Linux operating system, a Symbian operating system, an Android operating system, and/or the like. In various exemplary embodiments, communication component 220 may comprise any portable electronic communication device configured to receive images from scanner system 210 and to transmit images to document server 230.

SCMA 222 comprises software configured to manage operation of document imaging system 200. For example, SCMA 222 allows a user to request a document be scanned by scanner system 210. SCMA 222 also allows a user to select a name for the document to be scanned. Additionally, SCMA 222 allows a user to request transmittal of scanned images to document server 230. Moreover, SCMA 222 may be configured to implement any suitable operations necessary for use of document imaging system 200. In accordance with an exemplary embodiment, SCMA 222 comprises a software application developed in the Microsoft .NET development environment. SCMA 222 may also comprise software developed in any suitable development environment and/or programming language, for example Visual Basic, Java, C, C++, C#, PHP, Perl, Ruby, and the like. Additionally, SCMA 222 may comprise various hardware and/or software components suitable for controlling document imaging system 200.

In certain exemplary embodiments, software having similar functionality to SCMA 222 may be installed on a personal computer, allowing scanner system 210 to be utilized with that personal computer via USB module 212.

PDA Bluetooth module 224 comprises electrical circuitry configured to provide wireless communication between communication component 220 and scanner system 210, for example via a Bluetooth wireless communication protocol as discussed hereinabove. PDA Bluetooth module 224 may be fully integrated with communication component 220, such as a module provided by a PDA manufacturer. Alternatively, PDA Bluetooth module 224 may be an add-on accessory coupled to communication component 220. Moreover, communication component 220 and scanner system 210 may communicate via any suitable means, such as via electrical wire, infrared, optical, radio frequency, and the like, or any combination of the above.

PDA memory 226 comprises electrical circuitry configured to store data on communication component 220. In accordance with an exemplary embodiment, PDA memory 226 comprises RAM. PDA memory 226 may also comprise flash memory, such as a compact flash (CF) card, a secure digital (SD) card, and the like. Moreover, PDA memory 226 may comprise any suitable circuitry configured to store data on communication component 220.

PDA memory 226 is coupled to SCMA 222 and to PDA Bluetooth module 224. In this manner, SCMA 222 may direct PDA memory 226 to store data received by PDA Bluetooth module 224. SCMA 222 may also direct PDA memory 226 to retrieve data stored therein for transmittal by communication module 228.

Communication module 228 comprises electrical circuitry configured to connect communication component 220 to a network. For example, communication module 228 may comprise mobile telephone circuitry. Communication module 228 may also comprise circuitry compatible with other wireless communication technologies, such as Wi-Fi (as exemplified by IEEE 802.11) and/or WIMAX (as exemplified by IEEE 802.16). Additionally, communication module 228 may also be compatible with one or more wired communication technologies, such as universal serial bus (USB), Ethernet (as exemplified as IEE 802.3), Firewire (as exemplified by IEEE 1394), and the like. Moreover, communication module 228 may comprise any hardware and/or software configured to connect communication component 220 to a network and to allow communication component 220 to transfer data to document server 230.

In an exemplary embodiment, storage and retrieval component 230 comprises a document server including a computing system, such as a web server, coupled to a network. In accordance with an exemplary embodiment, document server 230 comprises web service 232, storage memory 234, and access control module 236. Further, document server 230 may comprise and/or be operative on multiple web servers, and the individual web servers may be placed in various locations on the network.

Web service 232 comprises a software program operating on document server 230. Web service 232 performs operations on data received from communication component 220. For example, web service 232 may evaluate a set of document images received from communication component 220, and may store the document images in storage memory 234, such as in a portion of a data table allocated to a particular company. Further, web service 232 may compress, decompress, convert, or otherwise modify data received from communication component 220. Moreover, web service 232 may receive, modify, transfer and/or store data received from communication component 220 in any suitable manner configured to allow subsequent operations on the data (e.g., retrieval, duplication, encryption, decryption, conversion, deletion, indexing, re-indexing, compression, decompression, transmission, printing, and the like).

Storage memory 234 comprises electronic circuitry configured to allow storage of data. In an exemplary embodiment, storage memory 234 comprises a magnetic disk, such as a hard drive. Storage memory 234 may also comprise RAM, flash memory, optical drives, and/or the like, or any combination of the above. Moreover, storage memory 234 may comprise any suitable storage medium configured to allow storage and retrieval of electronic data.

Storage memory 234 is coupled to web service 232 such that incoming data received by web service 232 may be written to storage memory 234. Storage memory 234 is also coupled to access control module 236 such that data kept in storage memory 234 may be retrieved, such as for delivery to a user.

Access control module 236 comprises a software program operating on document server 230. Access control module 236 is configured to restrict access to data stored in storage memory 234 such that only an authorized user may retrieve data from storage memory 234. Additionally, access control module 236 may be accessible to a user, such as via the Internet.

Access control module 236 is coupled to storage memory 234 in order to enable retrieval of data stored in storage memory 234. Access control module 236 is also coupled to an external network, such as a local area network (LAN), a wide area network (WAN), the Internet, and/or the like.

Figure 3:
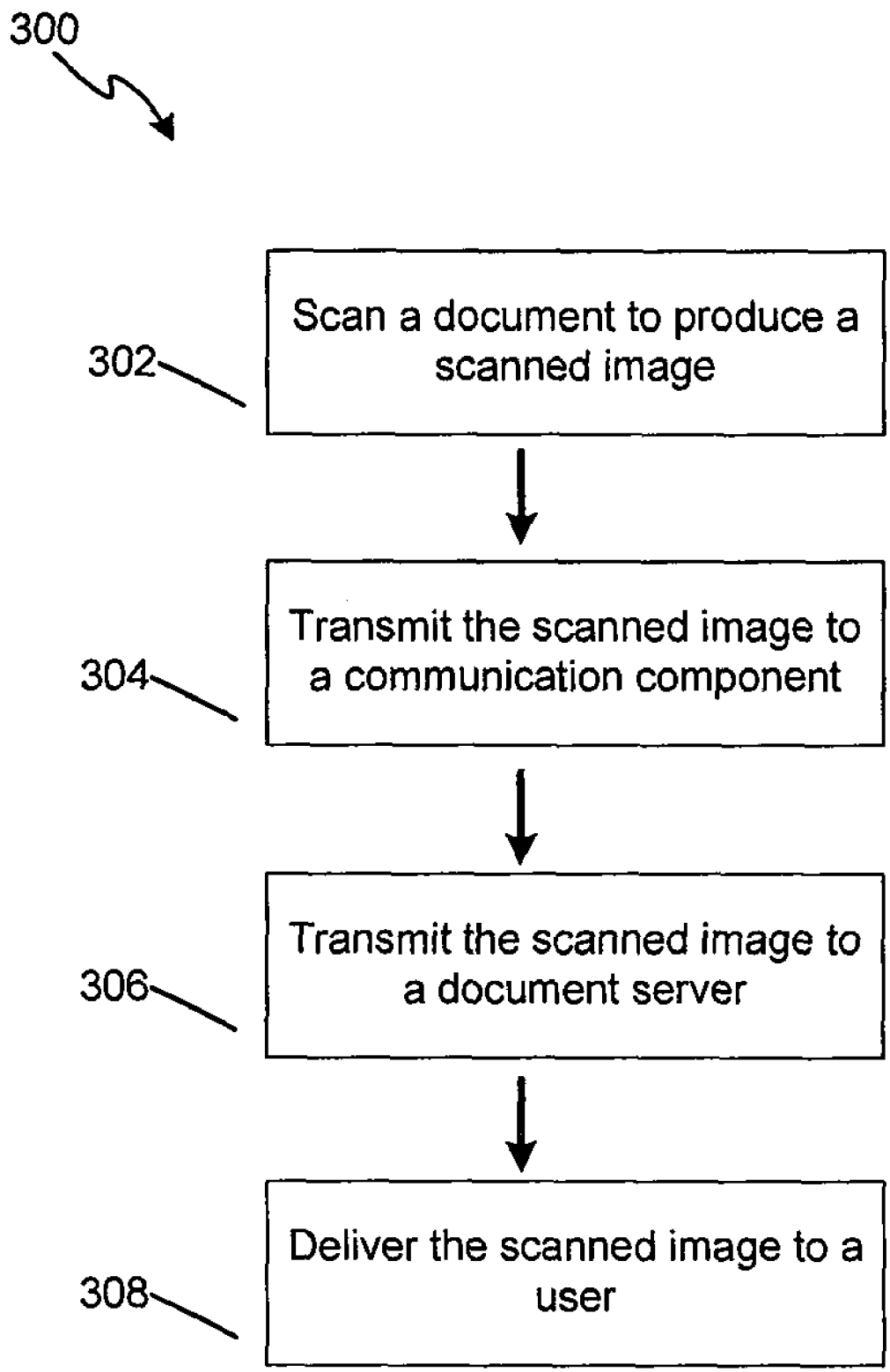
FIG. 3 illustrates a block diagram depicting a method of using a document imaging system in accordance with an exemplary embodiment.

With reference now to FIGS. 2 and 3, and in accordance with an exemplary embodiment, document imaging system 200 may be utilized as follows, for example via a method 300 for imaging a document.

A document is scanned to produce a scanned image (step 302). SCMA 222 is activated by a user, such as by pressing a button on communication component 220. SCMA 222 allows the user to name the document to be scanned, for example, by using the keyboard of the PDA. Accordingly, the user enters a desired name for the document to be scanned. Once the document to be scanned has been named, SCMA 222 opens a communication port to scanner system 210, such as a Bluetooth port. PDA Bluetooth module 224 sends an initialize command to scanner Bluetooth module 204. Scanner Bluetooth module 204 receives the initialize command and notifies SCMB 206 on scanner system 210. Once SCMB 206 is initialized, SCMB 206 sends scanner element 208 a command to begin scanning. As each document portion is scanned, it is saved in scanner memory 202.

The scanned image is transmitted from scanner system 210 to communications component 220 (step 304). Once all portions of the document are scanned by scanner element 208, SCMB 206 closes the file being saved in scanner memory 202, and prepares the file for transmission to communication component 220. SCMB 206 opens a communication port, such as a Bluetooth port, via scanner Bluetooth module 204. SCMB 206 then alerts PDA Bluetooth module 224 that a file is being transmitted. SCMB 206 transmits the one or more scanned document images to communication component 220.

SCMA 222 saves the scanned document images in PDA memory 226 on communication component 220. Data, such as scanned document images, may also be sent to communication component 220 before all pages are scanned. For example, scanned data may be sent to communication component 220 after each page of a document is scanned. Alternatively, scanned data may be sent to communication component 220 if scanner memory 202 becomes full or otherwise unavailable. Moreover, scanned data may be sent to communication component 220 at any appropriate time configured to allow scanned data to be safely transferred to communication component 220.

The scanned image is transmitted from communications component 220 to document server 230 (step 306). Once one or more scanned document images are stored in PDA memory 226, SCMA 222 may open a connection coupling communication component 220 to a network, such as a wireless phone network. In various exemplary embodiments, communication component 220 may be coupled to a network via one or more wireless communication protocols such as AMPS, CDMA, GSM, UTMS, IEEE 802.11, and/or the like. Moreover, communication component 220 may be coupled to a network via any appropriate mechanism and/or protocol configured to allow data to be extracted from PDA memory 226.

When communication component 220 is coupled to a network, the scanned images are transmitted from communication component 220 to document server 230. Because data is delivered from scanner system 210 to document server 230 via communication component 220, any appropriate method of data transmission may be used, and scanner system 210 is consequently not bound to any particular wireless or wired network or service provider.

Web service 232 is active on document server 230. Web service 232 evaluates data received from communication component 220. Based on information received from communication component 220, web service 232 inserts the data, such as scanned document images, into storage memory 234. Within storage memory 234, scanned document images may be stored in any suitable fashion, such as by being sorted into an appropriate company data table.

The scanned image may be delivered from document server 230 to a user (step 308). Once scanned document images are located in storage memory 234, access to the scanned document images is controlled by access control module 236. For example, a user may present an authentication request to access control module 236. Access control module 236 may validate the authorization request before allowing a user to retrieve data stored in storage memory 234. Furthermore, access control module 236 may grant a user selective access to only a portion of storage memory 234, such as to files associated with a particular company.

Access control module 236 may be accessed via a network, such as the Internet, and may deliver stored document images to a user via the Internet. Access control module 236 may also enable a system administrator to manage the contents of storage memory 234, such as by adding data, deleting data, encrypting data, decrypting data, moving data, duplicating data, converting data, compressing and/or uncompressing data, changing permissions on data, and the like, or any combination of the foregoing.

Additionally, web service 232 and/or access control module 236 may be configured to receive information for inclusion in storage memory 234 which was previously transferred from scanner system 210 to personal computer 260. For example, scanned information delivered from scanner system 210 via USB module 212 to personal computer 260 may then be transmitted to document server 230 via the Internet.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A document imaging system, comprising:
   a portable scanner system;
   a mobile communication device coupled to the scanner system via a first wireless connection; and
   a document server coupled to the mobile communication device via a second wireless connection,
   wherein the portable scanner system acquires a scanned image and transmits the scanned image to the mobile communication device via the first wireless connection,
   wherein the mobile communication device transmits the scanned image to the document server via the second wireless connection, and
   wherein the document server delivers the scanned image from the document server to an authorized user responsive to a request for the scanned image from the authorized user.

2. The system of claim 1, wherein the first wireless connection is compatible with a wireless communication protocol published by the Bluetooth Special Interest Group.

3. The system of claim 1, wherein the second wireless connection is at least one of: a GSM connection, a CDMA connection, or an IEEE 802.11 connection.

4. The system of claim 1, wherein the portable scanner system comprises a first scanner control module, a scanner memory, a scanner Bluetooth module, and a scanning element.

5. The system of claim 4, wherein the mobile communication device comprises a second scanner control module, a PDA memory, a PDA Bluetooth module, and a communication module.

6. The system of claim 5, wherein the document server comprises a web service, a storage memory, and an access control module.

7. The system of claim 1, wherein the portable scanner system comprises a USB connection for coupling the scanner system to a personal computer.

8. The system of claim 1, wherein the portable scanner system weighs less than 1.5 pounds.

9. A method for imaging a document, the method comprising:
   scanning, via a portable scanner system, the document to produce a scanned image;
   transmitting, via a first wireless connection, the scanned image from the portable scanner system to a mobile communication device;
   transmitting, via a second wireless connection, the scanned image from the mobile communication device to a document server; and
   delivering the scanned image from the document server to an authorized user responsive to a request for the scanned image from the authorized user.

10. The method of claim 9, wherein the first wireless connection is compatible with a wireless communication protocol published by the Bluetooth Special Interest Group.

11. The method of claim 9, wherein the second wireless connection is at least one of: a GSM connection, a CDMA connection, or an IEEE 802.11 connection.

12. The method of claim 9, wherein the portable scanner system comprises a first scanner control module, a scanner memory, a scanner Bluetooth module, and a scanning element.

13. The method of claim 12, wherein the mobile communication device comprises a second scanner control module, a PDA memory, a PDA Bluetooth module, and a communication module.

14. The method of claim 13, wherein the document server comprises a web service, a storage memory, and an access control module.

15. The method of claim 9, wherein the authorized user is located remote from the portable scanner system.

16. The method of claim 9, further comprising denying access to the scanned image to an unauthorized user.

17. The method of claim 9, further comprising grouping a plurality of scanned images associated with the authorized user.

18. The method of claim 9, further comprising transferring, via a USB cable, the scanned image from the portable scanner system to a personal computer.

19. The method of claim 18, further comprising transferring, from the personal computer, the scanned image to the document server.

* * * * *